United States Patent (10) Patent No.: US 8,931,401 B2
Cheung (45) Date of Patent: Jan. 13, 2015

(54) APPLIANCE FOR SIMULTANEOUS COOKING AND STIRRING

(75) Inventor: Man Fai Cheung, Hong Kong (CN)

(73) Assignee: Hang Shun Hing Company Limited, Kwun Tong, Hong Kong (CN)

( * ) Notice: Subject to any disclaimer, the term of this patent is extended or adjusted under 35 U.S.C. 154(b) by 724 days.

(21) Appl. No.: 13/239,645

(22) Filed: Sep. 22, 2011

(65) Prior Publication Data

US 2013/0074700 A1 Mar. 28, 2013

(51) Int. Cl.
*A21B 7/00* (2006.01)
*A47J 27/00* (2006.01)
*A47J 36/06* (2006.01)
*A47J 36/16* (2006.01)
*A47J 43/044* (2006.01)
*A47J 43/07* (2006.01)
*A47J 43/08* (2006.01)

(52) U.S. Cl.
CPC .............. *A47J 27/004* (2013.01); *A47J 36/06* (2013.01); *A47J 36/165* (2013.01); *A47J 43/044* (2013.01); *A47J 43/0755* (2013.01); *A47J 43/082* (2013.01)
USPC ........................................................ 99/348

(58) Field of Classification Search
CPC ....... A47J 27/004; A47J 36/06; A47J 36/165; A47J 43/044; A47J 43/0755; A47J 43/082
USPC ........... 99/339, 348, 357, 410, 412, 413, 423, 99/484; 366/146, 205, 206, 244, 249, 251, 366/272, 273, 274, 276, 282
See application file for complete search history.

(56) References Cited

U.S. PATENT DOCUMENTS

| | | | | |
|---|---|---|---|---|
| 2,749,426 | A | * | 6/1956 | Schwaneke .................... 219/432 |
| 3,635,147 | A | * | 1/1972 | Lee ................................. 99/348 |
| 6,026,735 | A | * | 2/2000 | Waterworth .................... 99/348 |
| 7,011,013 | B2 | * | 3/2006 | Leason ........................... 99/339 |
| 7,780,337 | B2 | * | 8/2010 | Peng ............................. 366/144 |
| 8,122,815 | B2 | * | 2/2012 | Wolfe ............................. 99/348 |
| 2012/0174800 | A1 | * | 7/2012 | Montavy et al. ................ 99/348 |
| 2012/0189746 | A1 | * | 7/2012 | DeLong ........................ 426/231 |

* cited by examiner

*Primary Examiner* — Dana Ross
*Assistant Examiner* — Joseph Iskra
(74) *Attorney, Agent, or Firm* — Leydig, Voit & Mayer, Ltd.

(57) ABSTRACT

A cooking appliance includes a base upon which a pot is supported, with a stirrer configured as a lid, for closing an open top of the pot. A tool coupled to a motorized drive of the stirrer extends downwardly into the pot. A heating element is coupled to the base and resiliently biased outwardly from the base to engage the base of the pot. A latch mechanism is provided for releasably connecting the pot to the base. The motorized drive includes a planetary gear set mounted coaxially with a pot axis, and a tool coupling is connected to a planet gear of the planetary gear set to drive the stirring tool in an orbital motion.

36 Claims, 5 Drawing Sheets

APPLIANCE FOR SIMULTANEOUS COOKING AND STIRRING

TECHNICAL FIELD

The present invention relates to cooking appliances providing for simultaneous cooking and stirring.

BACKGROUND OF THE INVENTION

For cooking foods such as soups, beverages and sauces, cooking appliances having heating elements and a mixing blade may be used for simultaneous cooking and stirring. However, although a number of such appliances are known a need exists for a cooking appliance that is more versatile and convenient to use.

Exemplary of the prior art is U.S. Pat. No. 7,780,337, which describes a cooking appliance comprising a pot which is demountable from a base in which a blender drive and a power supply is disposed. A heating element is fixed in the base of the pot and a blender blade is centrally located in a recess in the base. This arrangement lacks versatility in as much as it provides only a vigorous blending action suitable for certain recipes, and lacks the ability to provide a gentler stirring action, particularly over the whole area of the heated base. It is also difficult to clean owing to shape of the base, and the need to avoid water damage to the electrical couplings for the heating element in the base of the pot.

In appliances, such as electric rice cookers, it is known to provide a base in which a cavity is provided to receive a pot. In the bottom of the base, a heating element is spring mounted and urged outwardly of the base. When the pot is dropped into the base, the spring is compressed, until the pot drops sufficiently to be supported on the rim of the cavity. This arrangement provides for stable positioning of the pot. However the drawbacks are that the base is relatively large, making storage problematic. A heavy pot is also needed, particularly a pot with a thick metallic base to avoid localised hot spots, in which case good thermal performance is achieved as the spring ensures reliable contact with the element.

Advantageously an improved cooking appliance providing for simultaneous cooking and stirring should also address drawbacks such as undue complexity, limited adjustability, difficulty, and/or otherwise lack the means for performing a consistent heating and stirring function. It is an object of the present invention to overcome or substantially ameliorate the above disadvantages or more generally to provide an improved cooking appliance.

DISCLOSURE OF THE INVENTION

According to one aspect of the present invention there is provided a cooking appliance comprising:
a base member;
a heating element mounted to the base member, the heating element having an outer element surface;
resilient means urging the heating element outwardly from the base member;
a pot having a closed bottom and an open top, the bottom having an outer face complementary to the outer element surface, the base member and the bottom of the pot having complementary features for locating the pot on the base;
a stirrer housing comprising a closure portion for closing the top of the pot;
a support surface on the base for supporting the pot;
a motorised drive in the stirrer housing;
a housing electrical connector and base electrical connector in the stirrer housing and base member respectively, which electrical connectors are connected to supply power to the motorised drive;
a coupling drivingly connected to the motorised drive, the coupling being disposed in the closure portion,
a tool adapted to engage the coupling and protrude into the pot, and wherein,
in an operating position, the resilient means is deflected and holds the outer element surface in contact with the outer face of the bottom of the pot, and the cooking appliance further comprises a latch mechanism for releasably connecting the pot to the base in the operating position.

The latch mechanism may include one or more resiliently-biased latch members (as may be formed integrally or by a mechanism comprising a resilient member acting on a separate latch member) which engage with a latching surface (such as of an aperture, recess, shoulder or the like) to connect the pot to the base, such that movement of the release operator acts to disengage the resiliently-biased latch member from the latching surface. Many alternative well known latching mechanisms may also be used within the scope of the invention.

Preferably the latch mechanism includes a release operator user actuable to release a latching member, the pot further comprises a handle and wherein the release operator is mounted to the handle.

Preferably the release operator comprises a trigger disposed adjacent a concave side of the handle. Preferably the handle is an elongate member having a proximal end fixed to the pot and an opposing free end, the handle being curved downwardly between the proximal end and the free end.

Preferably the handle is an elongate cantilever-type member having a proximal end fixed to the pot and an opposing free end, the handle being curved downwardly between the proximal end and the free end and the release operator comprising a trigger is disposed adjacent a concave side of the handle. In this manner the trigger is positioned for ready actuation whenever the handle is grasped. Preferably the proximal end is fixed adjacent a rim of the open top, and a spout is disposed in the rim opposite the handle. Preferably the walls of the pot comprise transparent material, or a transparent window.

Preferably latching members are disposed in opposing sides of the base, with the corresponding latching surfaces being disposed in opposing sides of the peripheral flange.

Preferably the latch mechanism comprises an actuating rod operatively connected to the trigger, the actuating rod being received to slide up and down within a channel in the pot, an end of the actuating rod projecting from the pot through an aperture in the base to release the latch members.

Preferably the support surface supports at least part of the weight of the pot and comprises a surface of the base extending about the heating element. Preferably the support surface is disposed below the heating element, has a substantially annular form and is disposed in a transverse plane.

Preferably the bottom of the pot is circular and the complementary features comprise the heating element having circular form projecting from an upper side of the base member, the bottom of the pot having a complementary circular recess bounded by a peripheral flange extending around the lower end of the pot below the outer face. Advantageously this arrangement assists in making the appliance more compact and improving thermal performance.

Preferably the base member comprises a power supply and thermostat controlling the heating element, the base further comprises a stanchion, with the base electrical connector disposed at the upper end of the stanchion for engagement with the housing electrical connector disposed on the closure portion.

Preferably the stanchion extends circumferentially about the base, the upper end of the stanchion including a recess in which the spout is received.

Preferably the bottom of the pot is substantially planar and the pot has walls defining an axis, the motorised drive comprises a planetary gear set mounted coaxial with the axis, wherein the coupling is connected to a planet gear of the planetary gear set to provide the tool with an orbital motion.

In another aspect the invention provides a cooking appliance comprising:
a base member;
a heating element mounted to the base member, the heating element having an outer element surface;
resilient means urging the heating element outwardly from the base member;
a pot having a closed substantially circular bottom having a centre, and an open top, the bottom having an outer face complementary to the outer element surface, the base member and the bottom of the pot having complementary features for locating the pot on the base;
a stirrer housing comprising a closure portion for closing the top of the pot;
a support surface on the base for supporting the pot;
a motorised drive in the stirrer housing;
a housing electrical connector and base electrical connector in the stirrer housing and base member respectively, which electrical connectors are connected to supply power to the motorised drive;
a coupling drivingly connected to the motorised drive, the coupling being disposed in the closure portion,
a tool adapted to engage the coupling and protrude into the pot, and wherein,
the motorised drive comprises a planetary gear set mounted coaxial with the axis, and the coupling is connected to a planet gear of the planetary gear set to provide the tool with an orbital motion.

This invention provides an appliance which is effective and efficient in operational use, versatile convenient and safe to use. The resilient means urges the heating element outwardly to ensure intimate contact between the outer element surface and the outer face of the pot for optimum thermal performance, while the stirrer housing can be placed on, and removed from, the top of the pot in a like manner to the more usual pot lid. The appliance is thus simple and convenient to use, and eliminates electrical components and electrical connectors from the pot itself. The latch mechanism provides positive location to ensure the correct positioning of the pot for optimal thermal performance, as well as improved stability for safety.

BRIEF DESCRIPTION OF THE DRAWINGS

Preferred forms of the present invention will now be described by way of example with reference to the accompanying drawings, wherein.

DESCRIPTION OF THE PREFERRED EMBODIMENTS

Figure 1:
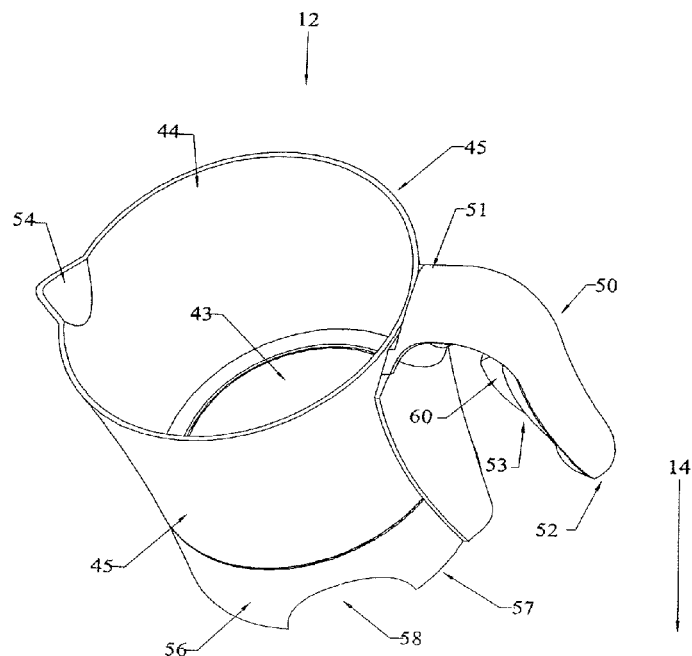
FIG. 1 is a perspective view of the three main parts of a cooking appliance according to the invention
Figure 1:
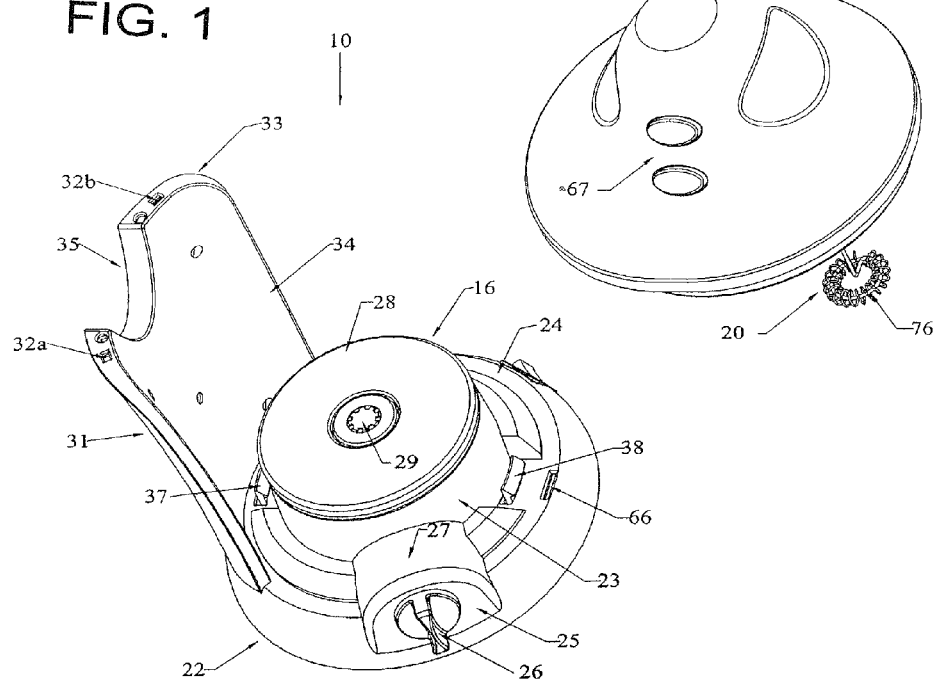

Referring to the drawings, a cooking appliance generally includes a base 10, a pot 12 and a stirrer 14. The base 10 is electrically connected to a power supply and includes a heating element assembly 16. The stirrer 14 includes a motorised drive 18 for rotating a stirring tool 20 and is configured as a lid of the pot 12. The electrical components are thus provided in the base 10 and stirrer 14, and are absent from the pot 12.

The base 10 is adapted to support the pot 12 upright on a planar surface and, to this end, may be provided with feet 21. The body 22 of the base may include a frustoconical boss 23 projecting from a penannular support surface 24 extending circumferentially thereabout. The convex surface 27 of a bulbous protrusion 25 may interrupt the support surface 24. A control 26 for the heating elements may be located in the protrusion 25. The heating element assembly 16 includes a heating element 15 embedded in a thermal conductor 13 having an annular form. The conductor 13 may be fixed to a dish-shaped mount 17, as by insulating washers and screws 19 disposed between the conductor 13 and the mount 17. Parallel guide fasteners 80 are fixed at one end in the base 10 and received in apertures in the mount 17 in a manner allowing limited vertical movement of the heating element assembly 16. Opposing ends of a compression spring abut the base 10 and mount 17 respectively, urging the heating element outwardly from the base. The heating element assembly 16 is disposed coaxially with the boss 23 from which it projects upwardly. An overheat temperature sensor 29 may be disposed centrally in the element assembly 16 may be urged outwardly from the mount 17 by a spring 30. An annular outer element surface 28 is provided on the uppermost side of the conductor 13 of the element assembly 16.

A stanchion 31 on the base 10 may extend above the element assembly 16, and include base electrical connectors 32a, 32b in its uppermost end 33. The stanchion 31 may extend circumferentially about the base, having a concave inner surface complementary to the walls of the pot 12. The upper end 33 includes a recess 35.

Figure 2A:
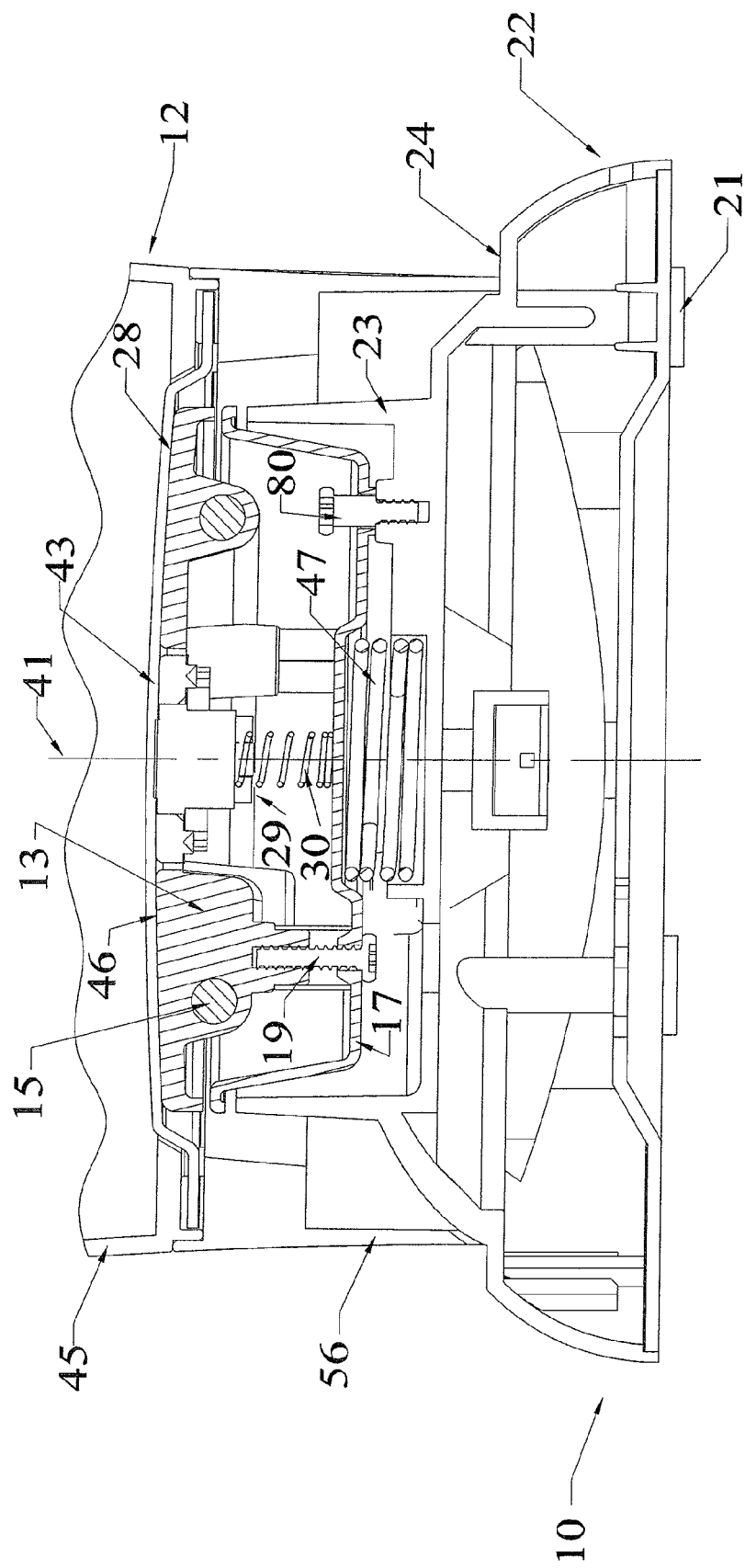
FIGS. 2a and 2b are schematic sectional views in respective upright planes through the appliance of FIG. 1.
Figure 2B:
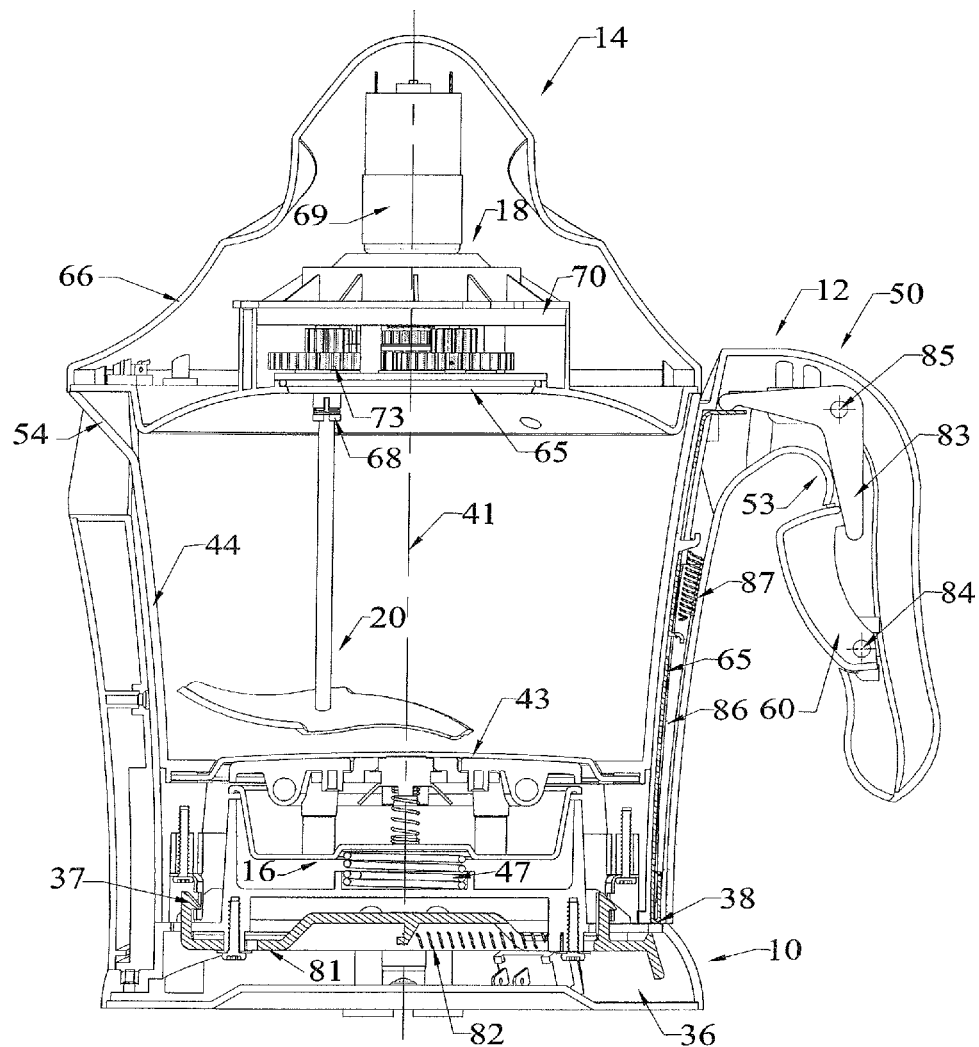
Figure 4:
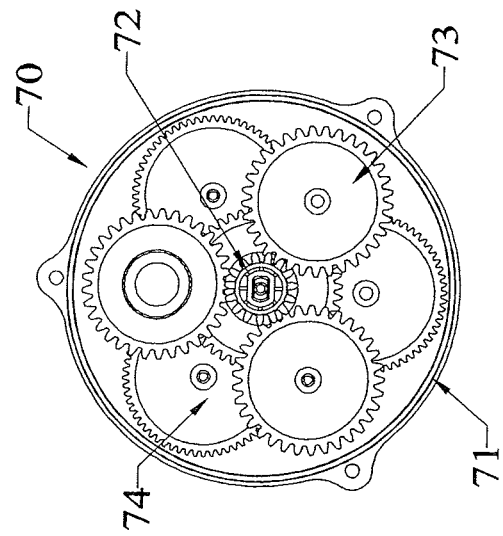
FIG. 4 is a schematic of the planetary gear set of the stirrer of FIG. 1.
Figure 3:
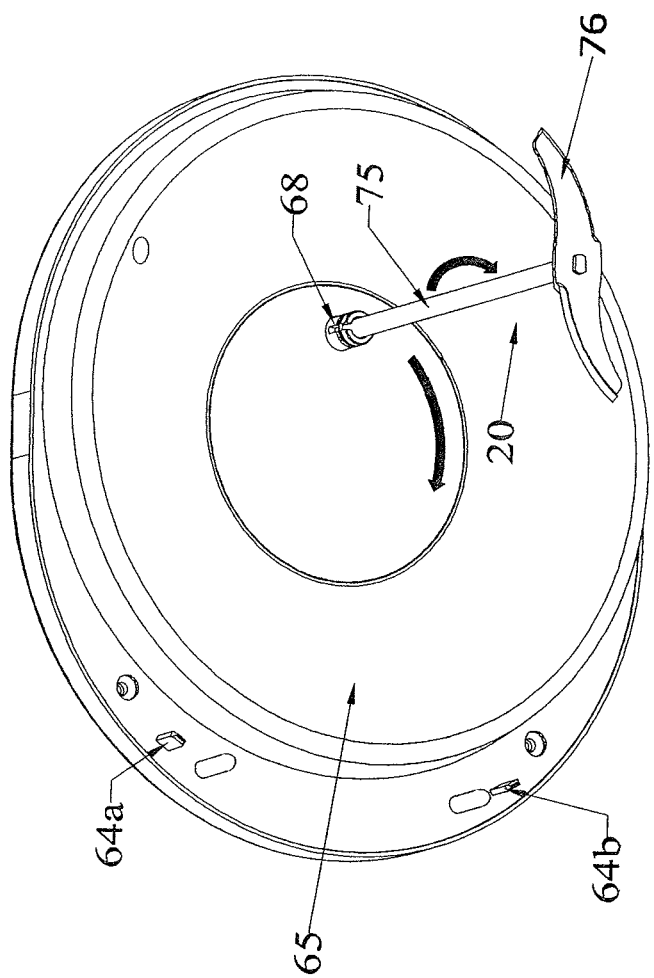
FIG. 3 is a perspective view from below of the stirrer of FIG. 1.
Figure 5:
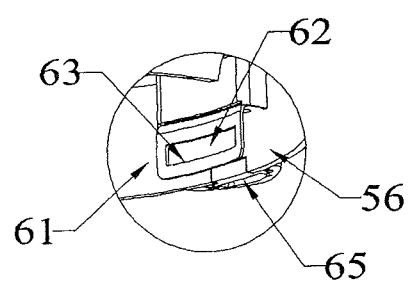
FIG. 5 is a fragmentary view of a tab disposed ion the inside of the lower end of the pot the appliance of FIG. 1.
Figure 6:
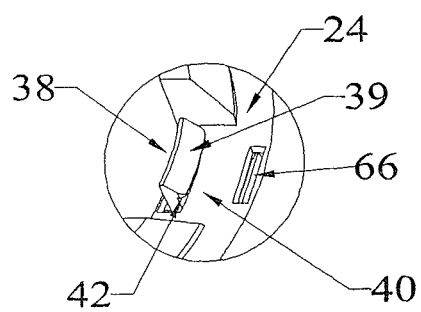
FIG. 6 is a fragmentary view of a latching member for engagement with the tab of FIG. 5.

A latch mechanism 36 for releasably connecting the pot 12 to the base 10 may include latching members 37, 38 formed on a locking bar 81 mounted to slide longitudinally. Each of the latching members 37, 38 is disposed in a respective opening on opposing sides of the base. Both the latching members 37, 38 are biased by a spring 82 (to the locked position shown in FIG. 2b), with upper faces 39 of the heads 40 inclined to the axis 41, and with a generally transversely aligned face 41 provided below the head 40. The operation of the heating element 15 may be interlocked with the latch mechanism 36, to ensure that the element does not operate unless the pot 12 is latched in position.

The pot 12 has a closed bottom 43 from which walls 44 extend to an open top 45. The bottom 43 may be circular with an outer face 46 which is complementary to the outer element surface 28 against which it is held by a spring 47. The walls 45 may be of transparent material. An elongate cantilever-type handle 50 may be hollow, with a proximal end 51 fixed to the pot 12 and an opposing free end 52. The handle 50 is curved downwardly between the proximal end 51 and the free end 52 to define a concave side 53. A spout 54 may be disposed in the rim of the top 45 opposite the proximal end 51. A circular recess 55 may be provided in the lower end of the pot, bounded by a flange 56 that extends peripherally below the outer face 46. The lower end of the flange 56 may be disposed in a transverse plane and, in use, rests upon the support surface 24 to support part of the weight of the pot 12. A concavity 58 in the flange 56 receives the protrusion 25. The pot 12 may include a pair of opposing tabs 61 fixed in the recess 55 adjacent the flange 56. The tabs 61 may include an opening 62 in which a latching surface 63 is disposed, the latching surface 63 extending in a transverse plane. When locked each latching surface 63 abuts with a respective face 41 of one of the latching members 37, 38.

The walls 45 and flange 56 may be formed separately or integrally, as from polymer, while the bottom 43 of the pot 10 is formed from a thin metallic sheet and has a dished form which is upwardly convex. The handle assembly may also predominantly comprise moulded polymeric components, thus providing an extremely lightweight pot. However, to obtain satisfactory thermal performance, particularly avoiding localised overheating of the bottom 43 which could cause burning, it is essential to ensure that there is intimate contact of substantially the whole of the outer face 46 of the bottom 43 with the element surface 28. This must be ensured for all products produced within the manufacturing dimensional tolerances, and under all conditions of use. To this end the element surface 28 may be convex, and the outer face 46 of the bottom 43 concave. The complementary convex element surface 28 and concave outer face 46 provide a self-centering action and help ensure this intimate contact is achieved, together with the spring biased heating element assembly 16 and the counteracting latch mechanism 36. These features thus contribute toward the ability to provide a lightweight pot 12.

The appliance provides a compact arrangement, with the heating element assembly 16 projecting from the top of the base 10 and providing the latch mechanism 36 allows this compact arrangement without compromising the stability of the mounting of the pot 12. An operator for releasing the latch mechanism in the form of a trigger 60 may be mounted in the handle 50 by a pivot 84 at its lower end, its upper end abutting a rocker lever 83 mounted by a pivot 85 to the handle 50. The latch mechanism 36 further comprises an actuating rod 65 received to slide longitudinally up and down within a channel 86 in the pot. A tension spring 87 may have one end fixed to the pot, and the other end to the actuating rod 65 so as to urge the rod 65 upwardly to abut the rocker lever 83, thus operatively connecting the actuating rod 65 to the trigger 60 and biasing the trigger 60 to the latched position illustrated in FIG. 2b, in it which it extends from the concave side 53. Disposed in this manner, users find that the latch mechanism is readily released when the handle 50 is grasped. Squeezing the trigger 60 inwardly (to the position indicated by the dashed line in FIG. 2b) the lower end of the actuating rod 65 projects from the pot 12 through an aperture 66 in the base 10, abutting an inclined face 90 on the locking bar 81 to release the latch members 37, 38. Movement of the trigger 60 thus acts to simultaneously disengage both resiliently-biased latch members 37, 38 from the respective tabs 61.

The stirrer 14 has a housing comprising a lower closure portion 65 and an upper cover portion 66, these two portions 65, 66 cooperating to hold the motorised drive 18. The stirrer housing includes housing electrical connectors 64a, 64b, for engagement with connectors 32a, 32b to supply power to the motorised drive 18. Controls 67, such as speed controls for the motorised drive 18, may be disposed on the cover portion 66. The closure portion 65 closes the open top of the pot and includes a coupling 68 drivingly connected to the motorised drive 18, for rotating a stirring tool which may be received in the coupling and protrude into the pot. The motorised drive 18 may comprise a DC electric motor 69 driving a planetary gear set 70 mounted coaxial with the axis 41. The planetary gear set 70 comprises a ring gear 71, sun gear 72 and planet gears 73 mounted on a planet carrier 74. The sun gear 72 is coupled directly, or indirectly via another gear set (not shown), to the motor 69, and the planet gear 73 is fixed to the coupling 68. The tool 20 includes an axially extending shaft 75 having an implement 76, such as a blade or whisk, fixed on its outer end. In this manner, torque from the motor 69, is transmitted via the planetary gear set 70 to the stirring tool 20, which is thus moves the implement around the pot in an orbital motion.

In use, as the pot 12 is lowered onto the base 10, the concave surface 34 of the stanchion 31 serves as a guide to properly locate the pot in the transverse direction. As the pot is lowered, the element assembly 16 enters into the recess 55 in the base 10 before the element surface 28 and outer face 46 abut. Further lowering thus compresses the element-biasing spring 47. The tabs 61 initially abut the faces 39, deflecting the heads of the latching members 37, 38 radially inwardly, before the heads project into the apertures 62, and the surfaces 42 and 63 are engaged to lock the pot in the operating position. In this position the spout 54 extends into the recess 35 in the stanchion 31 and the pot 12 is held in a stable manner, such that it cannot be disturbed by the stirring action.

A tool 20 is fixed to the coupling 68 before the stirrer is placed like a lid over the pot 14. The closure portion 65 closes the top of the pot, including the spout 54. The electrical couplings 64a, 64b and associated pegs 75 locate the stirrer angularly about the axis 41, and prevent rotation relative to the pot. The motorised drive 18 can thus be operated continuously, intermittently, etc, or under automatic control as desired. When cooking is completed, the stirrer 14 is removed, and by grasping the handle 50 and squeezing the trigger 60 the latch mechanism is released, and the pot may be removed.

Aspects of the present invention have been described by way of example only and it should be appreciated that modifications and additions may be made thereto without departing from the scope thereof.

The invention claimed is:
1. A cooking appliance comprising:
   a base member;
   a heating element mounted to the base member, wherein the heating element has an outer element surface;
   resilient means urging the heating element outwardly from the base member;
   a pot having a closed bottom and an open top, wherein
      the bottom has an outer face complementary to the outer element surface, and
      the base member and the bottom of the pot have complementary features for locating the pot on the base member;
   a stirrer housing comprising a closure portion for closing the top of the pot;
   a support surface on the base member for supporting the pot;
   a motorised drive in the stirrer housing;
   a housing electrical connector and a base electrical connector in the stirrer housing and base member. respectively, wherein the housing electrical connector and the base electrical connector are connected to supply power to the motorised drive;
   a coupling drivingly connected to the motorised drive, wherein the coupling is disposed in the closure portion;

a tool for engaging the coupling and protruding into the pot, wherein, in an operating position, the resilient means is deflected and holds the outer element surface in contact with the outer face of the bottom of the pot; and a latch mechanism for releasably connecting the pot to the base member, in the operating position, wherein the pot further comprises a handle, the latch mechanism comprises a release operator actuable for releasing a latching member, wherein the release operator comprises a trigger, and an actuating rod operatively connected to the trigger, the actuating rod is received in and slides up and down within a channel in the pot, the release operator is mounted to the handle, the trigger is disposed adjacent a concave side of the handle, the actuating rod is received in and slides up and down within a channel in the pot, and an end of the actuating rod projects from the pot, through an aperture in the base member, to release the latching member.

2. The cooking appliance of claim 1, wherein
the handle is an elongate member having a proximal end fixed to the pot, and an opposing free end, and
the handle is curved downwardly between the proximal end and the free end.

3. The cooking appliance of claim 2, wherein
the proximal end of the handle is fixed adjacent a rim of the open top, and
the pot includes a spout disposed in the rim, opposite the handle.

4. The cooking appliance of claim 1, wherein the pot includes walls of a transparent material or having a transparent window.

5. The cooking appliance of claim 1, wherein the bottom of the pot includes a peripheral flange, and
the cooking appliance further comprises
latching members disposed in opposing sides of the base member, and
latching surfaces disposed in opposing sides of the peripheral flange.

6. The cooking appliance of claim 1, wherein the support surface supports at least part of the pot and comprises a surface of the base member extending about the heating element.

7. The cooking appliance of claim 6, wherein the support surface is disposed below the heating element, has a substantially annular form, and is disposed in a transverse plane.

8. The cooking appliance of claim 1, wherein
the bottom of the pot is circular, and
the complementary features comprise
the heating element having a circular form that projects from an upper side of the base member, and
the bottom of the pot having a circular recess complementary to the heating element, bounded by a peripheral flange, and extending around a lower end of the pot, below the outer face.

9. A cooking appliance comprising:
a base member;
a heating element mounted to the base member, wherein
the heating element has an outer element surface, and
the base member comprises a power supply and a thermostat controlling the heating element;
resilient means urging the heating element outwardly from the base member;
a pot having a closed bottom and an open top, wherein
the bottom has an outer face complementary to the outer element surface, and
the base member and the bottom of the pot have complementary features for locating the pot on the base member;
a stirrer housing comprising a closure portion for closing the top of the pot;
a support surface on the base member for supporting the pot;
a motorised drive in the stirrer housing;
a housing electrical connector and a base electrical connector in the stirrer housing and base member. respectively, wherein
the housing electrical connector and the base electrical connector are connected to supply power to the motorised drive, and
the base member further comprises a stanchion, with the base electrical connector disposed at an upper end of the stanchion for engagement with the housing electrical connector when the closure portion closes the top of the pot;
a coupling drivingly connected to the motorised drive, wherein the coupling is disposed in the closure portion;
a tool for engaging the coupling and protruding into the pot, wherein, in an operating position, the resilient means is deflected and holds the outer element surface in contact with the outer face of the bottom of the pot; and
a latch mechanism for releasably connecting the pot to the base member, in the operating position.

10. The cooking appliance of claim 9, wherein the pot includes a spout,
the stanchion extends circumferentially about the base member, and
the upper end of the stanchion includes a recess in which the spout is received.

11. The cooking appliance of claim 9, wherein
the bottom of the pot is substantially planar,
the pot has walls defining an axis,
the motorised drive comprises a planetary gear set mounted coaxially with the axis, and
the coupling is connected to a planet gear of the planetary gear set to drive the tool with an orbital motion.

12. A cooking appliance comprising:
a base member;
a heating element mounted to the base member, wherein
the heating element has an outer element surface, and
the base member comprises a power supply and thermostat controlling the heating element;
resilient means urging the heating element outwardly from the base member;
a pot having a closed substantially circular bottom having an axis, and an open top, wherein
the bottom has an outer face complementary to the outer element surface, and
the base member and the bottom of the pot have complementary features for locating the pot on the base member;
a stirrer housing comprising a closure portion for closing the top of the pot;
a support surface on the base member for supporting the pot;
a motorised drive in the stirrer housing;
a housing electrical connector and a base electrical connector in the stirrer housing and the base member, respectively, wherein the housing electrical connector and the base electrical connector are connected to supply power to the motorised drive, wherein the base member comprises a stanchion, with the base electrical connector disposed at an upper end of the stanchion for engagement with the housing electrical connector when the closure portion is disposed on the top of the pot;

a coupling drivingly connected to the motorised drive, wherein the coupling is disposed in the closure portion; and a tool for engaging the coupling and protruding into the pot, wherein the motorised drive comprises a planetary gear set mounted coaxially with the axis, and the coupling is connected to a planet gear of the planetary gear set to drive the tool with an orbital motion.

13. The appliance of claim 12, wherein in an operating position, the resilient means is deflected and holds the outer element surface in contact with the outer face of the bottom of the pot, and the cooking appliance further comprises a latch mechanism for releasably connecting the pot to the base member, in the operating position.

14. The cooking appliance of claim 13, wherein the latch mechanism includes a release operator actuable to release a latching member, the pot further comprises a handle, and the release operator is mounted to the handle.

15. The cooking appliance of claim 14, wherein the release operator is disposed adjacent a concave side of the handle.

16. The cooking appliance of claim 15, wherein the handle is an elongate member having
a proximal end fixed to the pot, and
an opposing free end, and the handle is curved downwardly between the proximal end and the free end.

17. The cooking appliance of claim 16, wherein the proximal end of the handle is fixed adjacent a rim of the open top, and the pot includes a spout disposed in the rim, opposite the handle.

18. The cooking appliance of claim 12, wherein the pot includes walls of a transparent material or having a transparent window.

19. The cooking appliance of claim 9, wherein the bottom of the pot is circular, and the complementary features comprise the heating element having a circular form that projects from an upper side of the base member, and the bottom of the pot having a circular recess complementary to the heating element, bounded by a peripheral flange, and extending around a lower end of the pot, below the outer face.

20. The cooking appliance of claim 19, wherein the bottom of the pot includes a peripheral flange, and the cooking appliance further comprises latching members disposed in opposing sides of the base member, and latching surfaces disposed in opposing sides of the peripheral flange.

21. The cooking appliance of claim 12, wherein the support surface supports at least part of the pot and comprises a surface of the base member extending about the heating element.

22. The cooking appliance of claim 21, wherein the support surface is disposed below the heating element, has a substantially annular form, and is disposed in a transverse plane.

23. The cooking appliance of claim 12, wherein the bottom of the pot is circular, and the complementary features comprise the heating element having a circular form that projects from an upper side of the base member, and the bottom of the pot having a circular recess complementary to the heating element, bounded by a peripheral flange, and extending around a lower end of the pot, below the outer face.

24. The cooking appliance of claim 12, wherein the pot includes a spout, the stanchion extends circumferentially about the base member and has an upper end, and the upper end of the stanchion includes a recess in which the spout is received.

25. The cooking appliance of claim 1, wherein the base member comprises a power supply and thermostat controlling the heating element, and the base member further comprises a stanchion, with the base electrical connector disposed at an upper end of the stanchion for engagement with the housing electrical connector when the closure portion is disposed on the top of the pot.

26. The appliance of claim 25, wherein the pot includes a spout, the stanchion extends circumferentially about the base, and the upper end of the stanchion includes a recess in which the spout is received.

27. The cooking appliance of claim 1, wherein the bottom of the pot is substantially planar, the pot has walls defining an axis, the motorised drive comprises a planetary gear set mounted coaxially with the axis, and the coupling is connected to a planet gear of the planetary gear set to drive the tool with an orbital motion.

28. The cooking appliance of claim 9, wherein the latch mechanism includes a release operator actuable to release a latching member, the pot further comprises a handle, and the release operator is mounted to the handle.

29. The cooking appliance of claim 28, wherein the release operator comprises a trigger disposed adjacent a concave side of the handle.

30. The cooking appliance of claim 29, wherein the handle is an elongate member having a proximal end fixed to the pot, and an opposing free end, and the handle is curved downwardly between the proximal end and the free end.

31. The cooking appliance of claim 30, wherein the proximal end of the handle is fixed adjacent a rim of the open top, and the pot includes a spout disposed in the rim, opposite the handle.

32. The cooking appliance of claim 9, wherein the pot includes walls of a transparent material or having a transparent window.

33. The cooking appliance of claim 28, wherein the bottom of the pot includes a peripheral flange, and the cooking appliance further comprises latching members disposed in opposing sides of the base member, and latching surfaces disposed in opposing sides of the peripheral flange.

34. The cooking appliance of claim 30, wherein the latch mechanism comprises an actuating rod operatively connected to the trigger, the actuating rod is received in and slides up and down within a channel in the pot, and an end of the actuating rod projects from the pot, through an aperture in the base, to release the latch members.

35. The cooking appliance of claim 9, wherein the support surface supports at least part of the pot and comprises a surface of the base member extending about the heating element.

36. The cooking appliance of claim 35, wherein the support surface is disposed below the heating element, has a substantially annular form, and is disposed in a transverse plane.

* * * * *